Aug. 3, 1965   M. GEARY   3,198,459
IMPOSION THRUST ENGINE AND VEHICLE
Filed June 30, 1961   4 Sheets-Sheet 1

INVENTOR.
MILFORD GEARY
BY
Mason, Kolehmainen
Rathburn & Wyss
Atty's.

Aug. 3, 1965       M. GEARY       3,198,459
IMPOSION THRUST ENGINE AND VEHICLE
Filed June 30, 1961       4 Sheets-Sheet 2
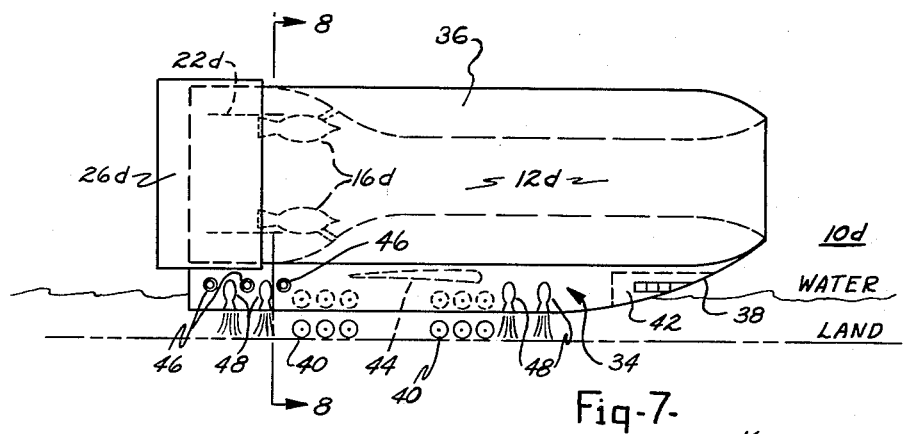
Fig-7-
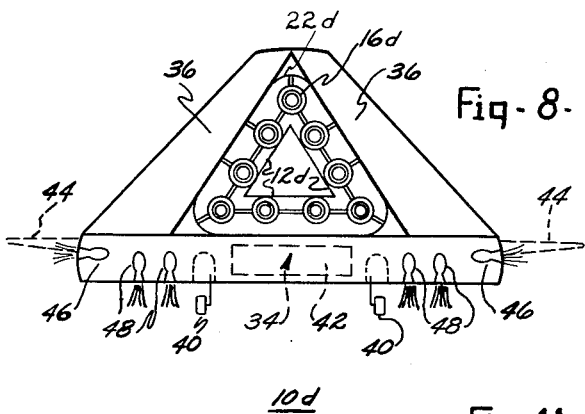
Fig-8-
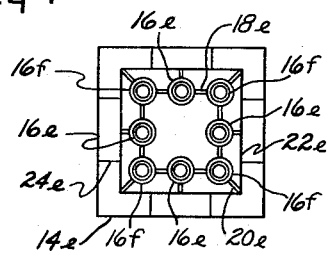
Fig-10-
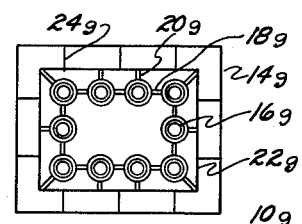
Fig-11-
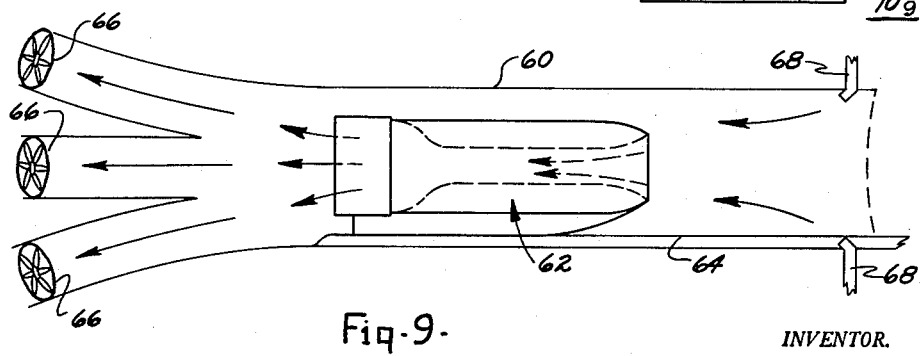
Fig-9-
INVENTOR.
MILFORD GEARY
BY
Mason, Kolehmainen
Rathburn & Wyss
attys.

Aug. 3, 1965    M. GEARY    3,198,459
IMPOSION THRUST ENGINE AND VEHICLE
Filed June 30, 1961    4 Sheets-Sheet 3

INVENTOR.
Milford Geary
BY
Mason, Kolehmainen
Rathburn + Wyss
Atty's.

Aug. 3, 1965  M. GEARY  3,198,459
IMPOSION THRUST ENGINE AND VEHICLE
Filed June 30, 1961  4 Sheets-Sheet 4
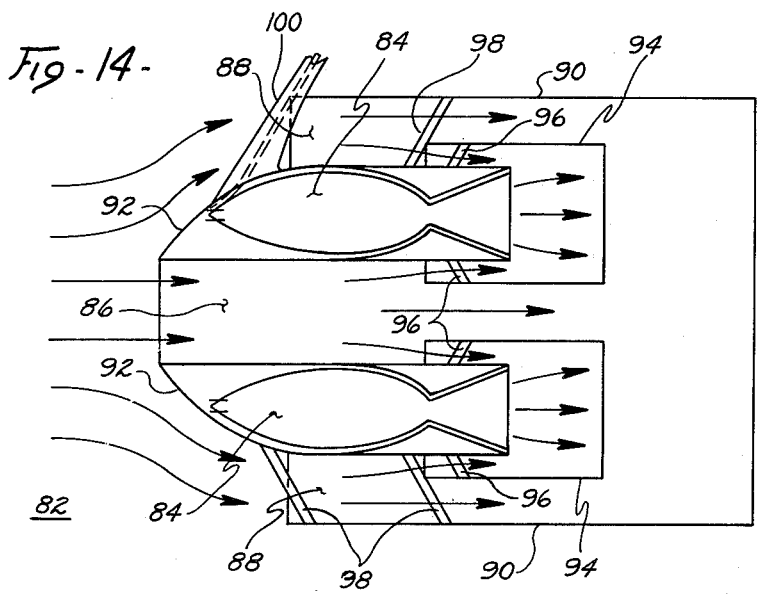
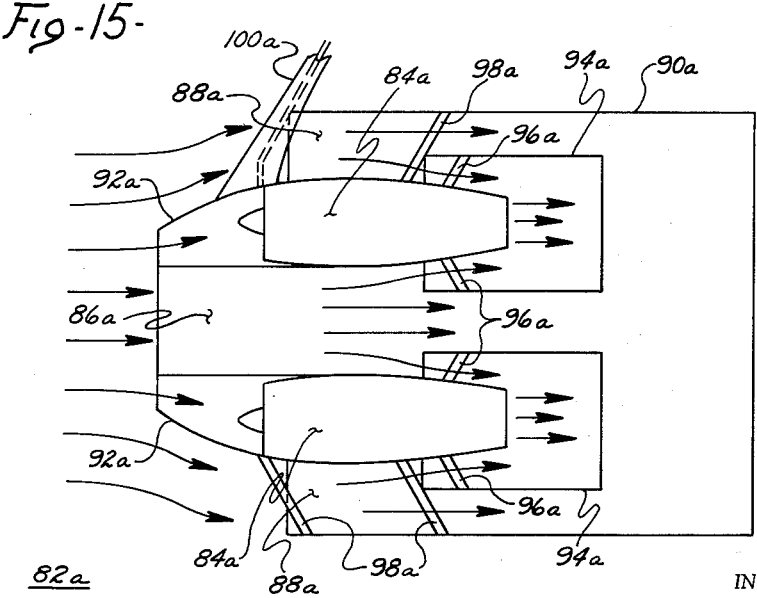
INVENTOR.
Milford Geary

United States Patent Office 3,198,459
Patented Aug. 3, 1965

3,198,459
IMPOSION THRUST ENGINE AND VEHICLE
Milford Geary, R.R. 1, Polo, Ill.
Filed June 30, 1961, Ser. No. 121,205
4 Claims. (Cl. 244—73)

This invention relates to an imposion thrust engine and vehicle designed for travel in the earth's atmosphere to outer space, and method and apparatus for launching the same. Imposion thrust is defined as any thrust either totally or partially produced by transferring energy from a first stream of relatively high temperature fluid to a second contiguous stream having a lower temperature. More particularly, the invention relates to a new and improved thrust engine and vehicle which provides a main flow through or around the vehicle and engine contiguous to the thrust flow available from a heated jet reaction thrust engine such as a rocket or thermal-air engine thereby increasing the resultant thrust of the engine and vehicle through flow expansion.

Present rocket and thermal-air thrust vehicles are limited in weight and size because of the large amount of fuel and/or oxidizing agents it is necessary to carry in order that the vehicle can accelerate enough to get out of the main gravitational field of the earth and into outer space. The thrust of present-day rocket and thermal-air engines is also limited by the metals available not being able to withstand higher temperatures which could produce greater thrust in the engines.

It is therefore an object of the present invention to produce a new and improved thrust engine vehicle for travel in the earth's atmosphere and outer space which will have a greater thrust available per unit fuel weight carried in the vehicle.

Another object of the present invention is to provide a new and improved thrust engine and vehicle for travel in the earth's atmosphere and outer space in which the thrust available from a rocket or thermal-air engine of the vehicle is increased by the imposion on main flows through or around the engine and vehicle.

Another object of the present invention is to produce a new and improved imposion thrust engine in which the imposion of a main flow through the engine upon a rocket of thermal-air engine thrust, results in cooling the surfaces of these engines thereby allowing higher jet temperatures and resultant greater thrust output from them.

Another object of the present invention is to provide a new and improved thrust vehicle utilizing an imposion thrust engine and having additionally included lateral and nadent or downwardly directed thrust units for effecting directional control and landing of the space vehicle.

Another object of the present invention is to provide a new and improved method and means for launching a thrust vehicle of the imposion type described resulting in less fuel weight being required to be carried in the thrust vehicle itself.

The foregoing and other objects and advantages of the present invention are obtained by providing a space vehicle having a tube through which a substantially unimpeded relative main or imposion flow of air or other mass particles in outer space is contained and conducted confluent to the heated jet of a rocket or thermal-air engine thereby permitting transfer of energy to the imposion flow resulting in an increased mass flow from the vehicle with resultant greater thrust. The tube portion of the vehicle can be round, square, triangular, rectangular or other shape in cross section as necessitated by the intended use of the vehicle. An outer insulation flow is also provided to cool the outer surfaces of the rocket or thermal-air engine parts and to add additional thrust to the vehicle by heating of the insulation flow.

In one specific embodiment of a vehicle utilizing an imposion thrust engine, according to the present invention, a triangular cross section imposion tube is provided having fuel chambers on two sides and a base on the third side. The base is provided with an upward sloping forward portion for landing the vehicle on a water surface. The base unit also contains lateral thrust units at the aft for directional control, nadent or downward thrust units for cushioning landings and retractable landing gears and wings for landing.

An artificially drafted launching tunnel is provided in order to induce an imposion flow through and around the vehicle to develop thrust for launching. A low combustible fuel or water is fed into the open end of the tunnel and is ignited or vaporized by the rocket or thermal-air engine exhaust of the space vehicle and the mixture is exhausted out the rear of the launching tunnel by mechanical means. In this manner, a great quantity of fuel for launching the vehicle can be supplied from the ground installation rather than having to be carried in the space vehicle itself.

The present invention can best be understood by the detailed description to follow in conjunction with the drawings, in which:

FIG. 7 is a side elevational view of another form of space vehicle as characterized by the features of the present invention and having a triangular cross section imposion tube and a landing base;

FIG. 8 is a transverse sectional view of the space vehicle of FIG. 7 taken along line 8—8;

FIG. 9 is a longitudinal sectional view of a launching tunnel as characterized by the features of the present invention illustrating the space vehicle of FIG. 7 therein during launching;

FIGS. 10 and 11 are transverse sectional views of modified forms of the space vehicles having square and rectangular imposion tubes respectively;

FIG. 14 is a partial sectional side elevation of a modified form of imposion thrust engine utilizing rocket engines; and FIG. 15 is a partial sectional side elevation of a modified form of imposion thrust engine utilizing thermal-air engines.

Figures 1, 2:
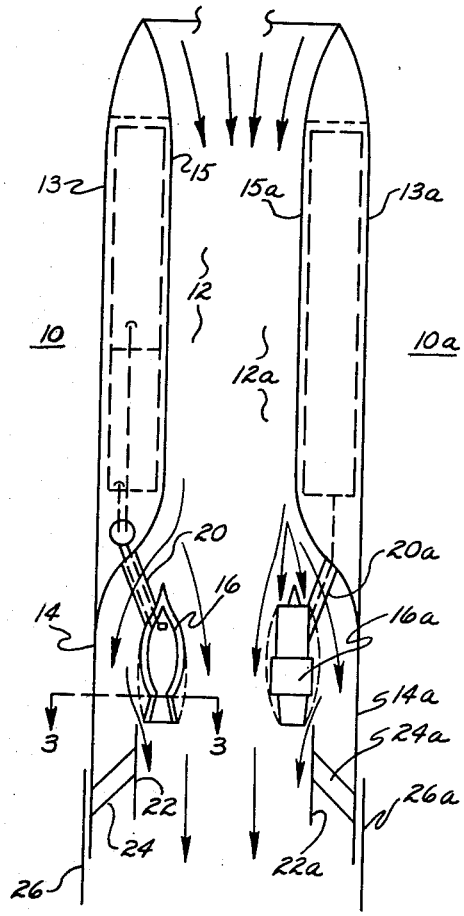
FIG. 1 is a partial longitudinal sectional view of an imposion thrust vehicle as characterized by the present invention utilizing rocket engines and a circular cross section imposion tube.
FIG. 2 is a partial longitudinal sectional view of a modified imposion thrust vehicle employing thermal-air engines.

Referring now to FIG. 1 of the drawings, there is illustrated an imposion thrust vehicle 10 having a centrally disposed imposion flow tube 12, which is circular in cross section and is provided with an outer wall 13 and an inner wall 15. As the vehicle 10 travels through the atmosphere or outer space, air or mass particles of outer space flow through the flow tube 12 with little or no turbulence or interruption impeding the flow, thus maintaining a relatively constant velocity in the tube 12. The walls 13 and 15 of the tube 12 are spaced apart toward the forward end of the space vehicle 10 in order to provide a space for housing fuel and oxidizer tanks, control and guidance mechanisms, and fuel-oxidizer metering and mixing devices.

Intermediate the space vehicle 10 and walls 13 and 15 of the tube 12 converge to form a thin-walled tubular outer wall portion 14. A plurality of rocket engines 16 are supported from the tube 12 in a concentric ring and are positioned to exert their thrust blast within the wall portion 14. The rocket engines 16 are supported by a concentric ring connection 18 and a plurality of aerodynamically shaped struts 20 attached to the concentric ring 18 at one end and to the thickened portion of the wall of the tube 12. The struts 20 house and fuel and oxidizer lines and control mechanisms running to the rocket engines 16. Adjacent the outer edges of the nozzles of the rocket engines 16 is a concentric jet container ring 22 which is supported by radially disposed braces 24 from the outer wall portion 14. Adjacent the outer end of the outer wall portion 14 is an outer telescopically sliding shell 26 which can be moved forward and backward relative to the outer wall portion 14.

As the space vehicle 10 moves through the earth's atmosphere or outer space, air or mass particles flow through the forward portion of the tube 12 substantially unimpeded except by wall fraction at substantially constant velocity. As the flow reaches the ring of rocket engines 16 a relatively small portion of the outer flow is diverted to the outer sides of the ring of the rocket engines 16 and is contained by the outer wall portion 14. This outer flow is called an insulation flow as it aids in cooling the outer wall portion 14, the container ring 22, and the outer portions of the ring of rocket engines 16. An inner portion of this insulation flow is bled off to cool the inside of the container ring 22 and thereby allow higher temperatures to be developed in the rocket engines 16.

The main portion of the flow through the tube 12 proceeds out through the rear of the space vehicle 10 and serves to cool the inwardly facing portions on the ring of rocket engines 16 thus allowing even higher temperatures to be developed in the rocket engines. The jets of very high temperature exhaust products from the rocket engines 16 being at substantially greater temperatures than the adjacent inner main flow and outer insulation transfers a large amount of energy to the main and insulation flows thereby increasing the velocities of these flows and greatly adding to the momentum of the mixture leaving the rear of the space vehicle 10 correspondingly increasing its thrust by utilizing the great quantities of energy which is normally lost to the atmosphere or outer space. Moreover, the invention is equally applicable to a space vehicle utilizing nuclear thrust and other engines.

It will be appreciated that the main imposion flow through the tube 12 of the imposion thrust vehicle 10 is not decelerated by compression, combustion or mixing as is the case in present ram-jet type engines and thus the overall thrust efficiency of the space vehicle 10 is considerably greater and smaller quantities of fuel are required to be carried by the vehicle 10 in order to get it into outer space. Also, because of the cooling effects of the insulation flow and imposion flow on the high temperature parts of the rocket engine 16, container ring 22, and outer wall portion 14, presently available metals can be utilized and higher rocket engine temperatures can be maintained to give greater thrusts. Also, there is no substantial mixing of the flows from the rocket engines 16 and the insulation and main imposion flows which would tend to reduce the thrust available from the rocket engines 16 as is present in conventional thermal-air thrust engines utilizing bypass air.

It is believed that at high velocities obtainable in outer space there will be enough mass flow through the vehicle 10 to add considerable thrust above that of a normal rocket operating in outer space. At decreased mass densities found in outer space, it will be necessary to provide additional cooling and less containment of flow around the outer periphery of the container ring 22 so that it will not burn up. In order to so provide, the slidable shell 26 is positioned circumjacent to the end of the outer wall 14. In atmospheric flight the shell 26 will be extended as there is provided sufficient air cooling thereof, and as the flight proceeds into outer space with the lessening of mass flow available for cooling, the outer shell 26 will be retracted to prevent burning up of the shell 26.

FIG. 2 illustrates a space vehicle 10a similar in construction and operation to the space vehicle 10 of FIG. 1, except that the rocket engines 16 of space vehicle 10 are replaced by thermal-air engines 16a, thus the vehicle 10a is limited to travel within the earth's atmosphere where thermal-air engines are operable. Similar parts in all the figures are designated by the same numerals, with different postscripts used in the various embodiments. The thermal-air engines 16a can be of the ram-jet, pulse jet or turbo-jet type and since air is used as an oxidizer it will not be necessary to carry an oxidizing agent within the walls of the vehicle 10a and a larger portion of the space can be utilized for carrying fuel.

Figure 3:
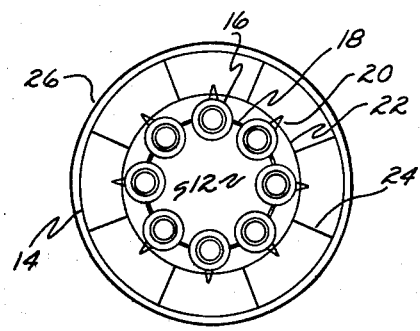
FIG. 3 is a transverse sectional view of the space vehicle of FIG. 1 taken along lines 3—3 and assuming that FIG. 1 shows the whole vehicle.
Figure 6:
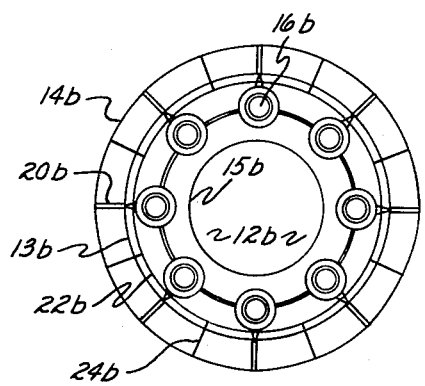
FIG. 6 is a transverse sectional view of the space vehicle of FIG. 4 taken along lines 6—6 and assuming that FIG. 4 shows the whole vehicle.

FIG. 3 illustrates sectional views of the space vehicle 10 as being generally circular in cross section; however, it should be understood that any desirable cross section could be used for special purposes such as the triangular form shown in FIG. 8, square form shown in FIG. 10, or rectangular form shown in FIG. 11.

Figures 4, 5:
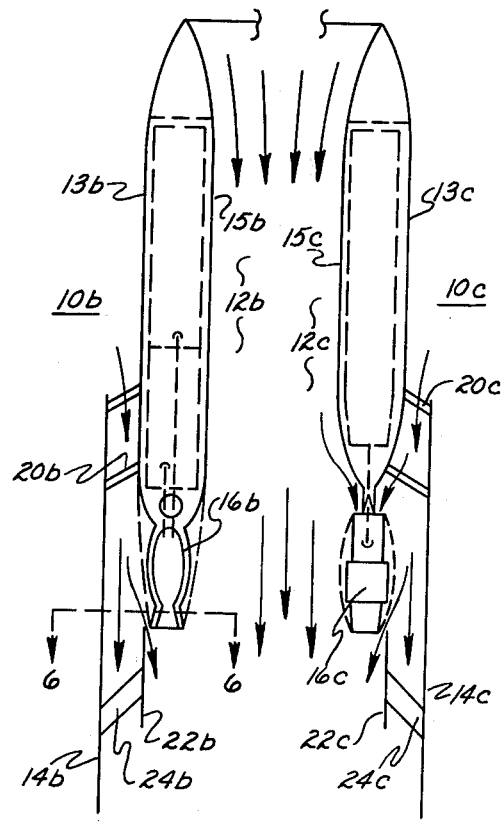
FIG. 4 is a partial longitudinal sectional view of another form of imposion thrust vehicle as characterized by the features of the present invention having a circular cross section imposion tube and utilizing rocket engines.
FIG. 5 is a partial longitudinal sectional view of a modified space vehicle similar to the embodiment of FIG. 4 but employing thermal-air engines.

Referring now to FIG. 4 of the drawings, there is illustrated a different form of imposion thrust vehicle 10b as characterized by the features of the present invention having a centrally disposed imposion flow tube 12b which is circular in cross section. The walls of the tube 12b are spaced apart at the forward end in order to provide space for fuel and oxidizer tanks, control mechanisms and a fuel metering and mixing system. At the rear end of the spaced apart portion of the tube 12b are provided a plurality of rocket engines 16b arranged in a circular configuration. Circumjacent the outer edges of the rocket engines 16b is a container ring 22b.

A tubular outer flow wall portion 14b is positioned on the aft portion of the main flow tube 12b and extends past and circumjacent to the retainer ring 22b. This outer flow wall portion 14b is attached to and spaced outward from an outer wall 13b of the tube 12b by a plurality of radially spaced braces 20b. The container ring 22b is supported by a plurality of radially spaced braces 24b attached to the inner surface of the outer wall portion 14b. As the vehicle 10b moves through the atmosphere or outer space, air or mass particles of outer space flow through the flow tube 12b with little or no turbulence or interruption impeding the flow thus maintaining a relatively constant velocity in the tube 12b. This flow cools the inner surfaces of the rocket engines 16b thus allowing higher temperatures and greater thrust to be developed in the rocket engines.

The hot blast from the rocket engines 16b being generally parallel to and much higher in temperature than the main flow through the tube 12b, energy is transferred to the main flow therefrom and the main imposion flow is substantially accelerated out the rear of the vehicle 10b thus giving a much greater thrust to the vehicle 10b.

Air or mass particles of outer space flowing around the outer surface of the main tube 12b is contained by the outer wall portion 14b as it reaches the aft portions of the vehicle 10b and is thereby directed adjacent to the outer surfaces of the rocket engines 16b for cooling. This flow, called insulation flow, also passes over the retainer ring 22b cooling its surface and a small portion of the flow is directed toward the inner surface of the retaining ring 22b thus insulating it from the hot blast of the rocket engines 16b. Since the insulation flow is parallel to the blasts of the rocket engines 16b energy is transferred to the insulation flow from the higher temperature rocket engine blast and the insulation flow is thereby accelerated giving the vehicle 10b still more thrust. Thus, it can be seen that the vehicle 10b operates on the same principle as the vehicles 10 and 10a with only a slight difference in construction.

FIG. 5 illustrates a space vehicle 10c which is similar to the vehicle 10b except that thermal-air engines 16c are used instead of rocket engines as in vehicle 10b. The operation of the two vehicles is the same except that vehicle 10c cannot develop thrust in outer space because of the need for air to operate the thermal-air engines 16c. Again, any type of thermal-air engines such as ram-jet, pulse-jet, turbo-jet engines and those utilizing nuclear and other enrgy can be used.

While the vehicles 10b and 10c have been described and drawn with circular cross sections, it is to be understood that oval, triangular, square and rectangularly cross-sectioned flow tubes could be used. FIGS. 8, 10, and 11 show the use of triangular, square, and rectangular cross-sectioned flow tubes. Moreover, as illustrated in FIG. 10, the vehicle may include rocket engines 16e in combination with thermal-air engines 16f.

Referring now to FIGS. 7 and 8 of the drawings, there is illustrated a space vehicle 10d as characterized by the features of the present invention having a triangular cross section imposion flow tube 12d having a plurality of thrust engines 16d such as heated jet reaction engines. The operation of the vehicle 10d is similar to the operation of the vehicles 10, 10a, 10b, and 10c, with the addition of some added features. A jet containment member 22d is positioned aft and radially outward from the engines 16d and a telescoping outer shell 26d is positioned at the aft end of the flow tube and movable forward and aft relative thereto. The bottom side of the flow tube 10d is provided with a base structure 34, and the two upper sides of the flow tube 10d are provided with removable structures 36 which contain fuel tanks, and oxidizer tanks for supplying the rocket engines. After the fuel and oxidizer are exhausted from the structures 36, they can be separated from the vehicle 10d thereby reducing the drag.

The base structure 34 has an up-sloping front portion 38 to allow the vehicle 10d to be landed on water surfaces and also a plurality of retractable landing gears 40 which can be lowered to effect a landing on hard surfaces. The base structure 34 also includes additional fuel and oxidizer and the control systems for the entire space vehicle 10d. A pressurized cabin 42 is provided to allow personnel to be carried in the base structure 34 in addition to the necessary equipment to sustain human life in outer space.

A pair of retractable wings 44 are provided in order to allow the vehicles 10d to glide and to land. In order to provide for landing and control, a plurality of lateral control engines or nozzles 46 are provided in the aft portion of the base structure 34 and also a plurality of nadent or downwardly directed thrust engines or nozzles 48 are provided in the bottom surface of the base structure 34 for cushioning the landings of the vehicle 10b. The engines or nozzles 46 and 48 can be separate engines or can be nozzles fed from the main flow through the tube 12d. The engines or nozzles 46 and 48 can be pivotally mounted within the base structure 34 to provide suitable directional control.

In order to launch imposion thrust vehicles of the type described in this specification without the necessity of carrying large quantities of fuel and/or oxidizer in the vehicle which would be expanded during take-off, it is desirable to provide a launching tube 60, as shown in FIG. 9. This tube 60 is larger in dimension than an imposion thrust vehicle 62 which is to be launched and a track or rail 64 is provided to guide the vehicle 62 along the tube 60 during launching. A plurality of large exhaust fans 66 are provided at the rear of the tube 60 to help create a large draft therethrough to function as a wind tunnel. This draft provides the imposion and insulation flow for the imposion thrust vehicle 62 which is to be launched. Fuel is introduced into the flow through the tube 60 at the forward end thereof by a plurality of radially spaced outlets 68. In launching the vehicle 62 which can be of any of the types previously described and illustrated in the drawings, the rocket or thermal-air engines of the vehicle 62 are started after the draft through the tube 60 is initiated by the exhaust fans 66. Fuel may be introduced through the outlets 68 to mix with the draft air igniting when it contacts the hot exhaust of the rocket or thermal-air engines of the vehicle 62, thus greatly increasing the flow velocity through the tube 60 and, consequently, the available thrust output of the vehicle 62. Moreover, water may be introduced through the outlets 68 which will be vaporized when it contacts the hot exhaust of the rocket or thermal-air engines of the vehicle 62 thus expanding into steam and further increasing the flow through the tube 60. The vehicle 62 is then released and accelerated rapidly in the tube 60 reaching sufficient speed and thrust as it leaves the mouth of the tube 60 to maintain flight on its own. Thus, it can be seen that the launching tube 60 provides a means for launching an imposion thrust vehicle by supplying power external to that developed by the vehicle and thus the weight of the fuel and/or oxidizer necessary to be carried by the vehicle itself is greatly reduced with the resultant advantages in range and speed of the vehicle after launching in this method.

Figure 12:
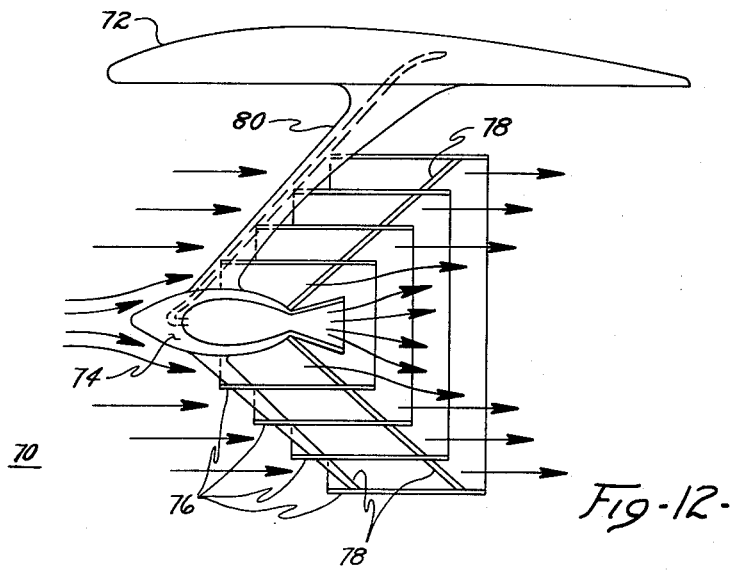
FIG. 12 is a partial sectional side elevation of a modified form of imposion thrust engine mounted on the wing of an ordinary aircraft.
Figure 13:
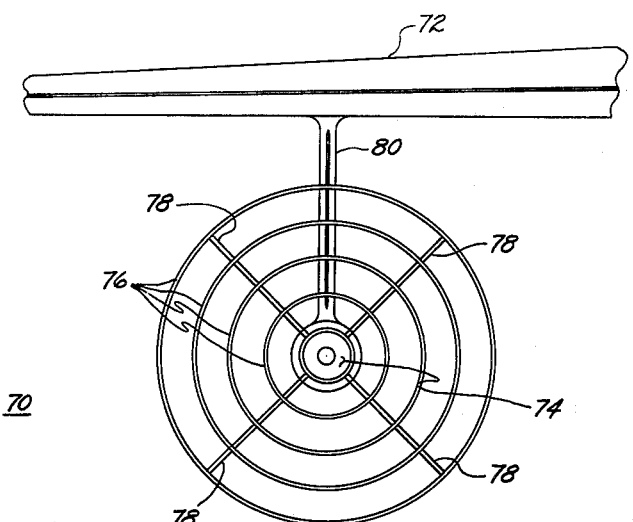
FIG. 13 is a rear sectional view of the engine and installation of FIG. 12.

Referring now to FIGS. 12 and 13 of the drawings, there is illustrated another form of imposion thrust engine 70 mounted on an aircraft wing 72. It is to be understood that the engine 70 could also be mounted on an aircraft in any appropriate place such as the fuselage or tail surface. A heated-jet reaction thrust engine 74, such as a rocket or thermal-air engine is mounted axially centered in the engine 70. A plurality of spaced apart concentric flow tubes 76 surround the engine 74 and are supported by a plurality of radially extending braces 78 having air foil shaped cross sections. The outer of the flow tubes 76 is supported from the wing 72 by an aerodynamically shaped strut 80 and fuel, oxidizer, and engine control lines pass from the wing 72 through the strut 80 and braces 78 to the engine 74.

As an aircraft with an imposion thrust engine 70 mounted on the wing 72 thereof moves through the air, air flows around the engine 74 and through the spaces between the concentric flow tubes 76. This air flow is contiguous to the heated jet discharge from the engine 74 and a transfer of energy occurs from the heated jet discharge to the surrounding flow causing it to expand and accelerate and thus giving a greater thrust output than would be produced from the engine 74 alone. The operating principle of the imposion thrust engine 70 is similar to that described earlier in this specification for vehicles 10, 10a, 10b and 10c except that there is no central flow, but only concentric flows surrounding the heated discharge jet from the engine 74.

Referring now to FIG. 14 of the drawings there is illustrated another form of an imposion thrust engine 82. A plurality of rocket thrust engines 84 are arranged around a central flow tube 86. The tube 86 can be of any desired cross section such as round, square, rectangular, triangular, oval, etc. Surrounding the engines 84 is an outer flow tube 88 which is concentric with the flow tube 86. The relative cross sectional areas of the flow tubes 86 and 88 is such that a much greater proportion of flow is directed to the outer flow tube 88 than through the central flow tube 86. Flow through the outer flow tube 88 is contained between an outer wall 90 and an inner wall 92. The forward portion of the wall 92 converges inwardly and joins with the wall of the inner flow tube 86. Surrounding the rearward portion of each rocket engine 84 and extending rearward therefrom are a plurality of thrust containment rings 94. These rings 94 are supported by radial braces 96 attached to the tube 86 and the wall 92. The outer wall 90 is supported by a plurality of radial braces 98 also attached to the inner wall 92, and the complete engine unit 82 is adapted to be supported from an aircraft wing or vehicle body by an aerodynamically shaped support strut 100 which houses fuel, oxidizer and control lines running to the rocket engines 84.

The general operation of the engine 82 is similar to the operating principle previously described in this specification for vehicles 10 and 10b, except in the engine 82 a larger portion of the flow is directed to the outer flow tube 88. In directing the flow to the outer flow tube 88 it can be seen from the drawing that the velocity of the flow through the tube 88 is greatly increased similar to the flow over the top of an air foil. This high velocity flow is then further accelerated by the transfer of energy from the heated jets of the rocket engines 84 resulting in thrust augmentation. The central flow through the central flow tube 86 also receives energy from the heated jets of the rocket engines 84 resulting in acceleration of this flow and thrust augmentation.

Referring to FIG. 15 of the drawings, there is illustrated another form of an imposion thrust engine 82a which is similar to the engine 82 except that thermal-air reaction thrust engines 84a are used instead of rocket thrust engines. The operation of engine 82a is similar to the operation of engine 82 discussed above.

While particular embodiments of the invention have been shown, it will be understood, of course, that the invention is not limited thereto, since many modifications may be made. It is, therefore, contemplated by the appended claims to cover any such modifications as fall within the true spirit and scope of the present invention.

What is claimed as new and desired to be secured by Letters Patent of the United States is:

1. A vehicle adapted for travel in the earth's atmosphere and outer space comprising: a flow tube adapted to contain a substantially unimpeded relative flow therethrough of the earth's atmosphere and outer space, said flow tube having an inner wall and a spaced apart outer wall; a plurality of heated jet reaction thrust engines secured relative to said flow tube and positioned to discharge their heated jets within said flow tube contiguous to said flow therethrough, said engines being positioned axially parallel to one another and to said flow tube; said outer wall extending aftward of said plurality of said engines; a jet containment member secured relative to said flow tube and positioned aft and radially outward from said plurality of said engines within said outer wall; and an outer shell telescopically mounted adjacent the aft end of said outer wall and movable longitudinally relative thereto.

2. A vehicle adapted for travel in the earth's atmosphere and outer space comprising: a flow tube adapted to contain an unimpeded relative flow therethrough of the earth's atmosphere and outer space, said flow tube having an inner wall and a spaced apart outer wall; a plurality of heated jet reaction thrust engines secured relative to said flow tube and positioned to discharge their heated jets within said flow tube contiguous to said flow therethrough, said engines being positioned axially parallel to one another and to said flow tube; said outer wall extending aftward of said plurality of said engines; a jet containment member secured relative to said flow tube and positioned aft and radially outward from said plurality of said engines within said outer wall.

3. A vehicle adapted for travel in the earth's atmosphere and outer space comprising: a circular cross-sectional flow tube adapted to contain a substantially unimpeded relative flow therethrough of the earth's atmosphere and outer space, said flow tube having an inner wall and a spaced apart outer wall, said inner and outer walls converging at a forward end of said flow tube and said inner wall enlarging to converge with said outer wall adjacent a mid portion of said flow tube; a plurality of heated jet thrust reaction engines secured relative to said flow tube and positioned to discharge their thrust blast aftward within said flow tube contiguous to said flow through said flow tube, said engines mounted in a circular relation axially parallel to each other and to said flow tube aft of said mid portion of said flow tube and forward of an aft end of said flow tube, said engines being axially aligned with said inner wall; a circular containment ring secured relative to said flow tube positioned aft of said engines within said flow tube spaced inwardly apart therefrom and spaced outwardly relative to said plurality of engines; and an outer shell telescopically mounted adjacent said aft end of said flow tube and longitudinally movable relative thereto.

4. A space vehicle adapted for travel in the earth's atmosphere and outer space comprising a main flow tube of triangular cross section, an outer tubular shell of triangular cross section secured to said flow tube, a plurality of main thrust engines arranged in triangular configuration secured within said shell and longitudinally positioned to discharge their thrust blast within said shell, a base member secured to one wall of said triangular cross-sectioned tube, said base member having an upwardly inclined forward portion converging with the front edge of said triangular cross-sectioned tube, said base member containing a plurality of downwardly extendable landing gears, a plurality of laterally directed thrust engines, a pluraltiy of downwardly directed thrust engines, a fuel and oxidizer supply for said rocket and thrust engines; the other two walls of said triangular tube having detachably secured to their outer faces members for containing supplies of fuel and oxidizer detachably connected to said main thrust engines.

References Cited by the Examiner
UNITED STATES PATENTS

| | | | |
|---|---|---|---|
| 1,375,601 | 4/21 | Morize | 60—35.6 |
| 1,796,693 | 3/31 | Schimmel, | 244—63 |
| 1,798,141 | 3/31 | Chillingworth | 244—52 X |
| 2,383,559 | 8/45 | Parker | 244—63 |
| 2,439,273 | 4/48 | Silvester | 60—35.6 |
| 2,444,332 | 6/48 | Briggs et al. | 244—49 |
| 2,907,536 | 10/59 | Von Zborowski | 244—12 |
| 2,933,266 | 4/60 | Von Zborowski | 244—12 |
| 2,971,724 | 2/61 | Von Zborowski | 244—12 |
| 3,073,549 | 1/63 | Griffith | 244—12 |

FERGUS S. MIDDLETON, *Primary Examiner.*

MILTON BUCHLER, *Examiner.*